US012589777B2

(12) United States Patent
Oguri et al.

(10) Patent No.: US 12,589,777 B2
(45) Date of Patent: Mar. 31, 2026

(54) VEHICLE

(71) Applicant: TOYOTA JIDOSHA KABUSHIKI KAISHA, Toyota (JP)

(72) Inventors: Haruki Oguri, Toyota (JP); Ikuma Suzuki, Okazaki (JP); Hirohito Ide, Nagoya (JP); Naohiro Tohyama, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 18/738,682

(22) Filed: Jun. 10, 2024

(65) Prior Publication Data

US 2025/0002053 A1     Jan. 2, 2025

(30) Foreign Application Priority Data

Jun. 30, 2023     (JP) ................................. 2023-107967

(51) Int. Cl.
*B60W 60/00*          (2020.01)
*B60W 50/035*        (2012.01)

(52) U.S. Cl.
CPC ........ *B60W 60/005* (2020.02); *B60W 50/035* (2013.01)

(58) Field of Classification Search
CPC ............. B60W 60/005; B60W 50/035; B60W 60/0015; B60W 2050/0004; B60W 2050/0082; B60W 60/001; B60W 50/00; B60W 2050/0002; B60Y 2304/076
See application file for complete search history.

(56) References Cited

U.S. PATENT DOCUMENTS 6,836,710 B2 * 12/2004 Yamaki .................. G07C 5/085
                                                                    701/34.3
7,136,780 B2 * 11/2006 Hirashima ........... G01R 31/006
                                                                    702/185
10,337,481 B2 *  7/2019 Enomoto ............ F02N 11/0848
11,214,273 B2 *  1/2022 Yousuf ................ B60W 50/045
11,511,762 B2 * 11/2022 Huang .............. B60W 60/0018
(Continued)

FOREIGN PATENT DOCUMENTS

JP        2019-177807 A     10/2019
JP        2021049872 A      4/2021
(Continued)

*Primary Examiner* — Masud Ahmed
(74) *Attorney, Agent, or Firm* — Sughrue Mion, PLLC

(57)                    ABSTRACT

The vehicle comprises a vehicle platform (VP) and an autonomous driving kit (ADK). VP comprises a first control device, and ADK comprises a second control device. The vehicle control interface box (VCIB) included in VP includes a first computer configured to communicate with both the first control device and the second control device. The first computer detects an operation mode selected from options including an autonomous mode and a manual mode, and records operation mode information indicating the detected operation mode. The first control device is configured to control the vehicle according to the operation mode detected by VCIB. At the time of restart, the first computer detects the selected operation mode based on the operation mode information recorded immediately before the stop.

4 Claims, 6 Drawing Sheets

(56) References Cited

U.S. PATENT DOCUMENTS

| | | | | |
|---|---|---|---|---|
| 11,693,753 | B2 * | 7/2023 | Ponnuvel | G06F 11/27 |
| | | | | 714/733 |
| 11,891,075 | B2 * | 2/2024 | Rocha | B60W 60/0018 |
| 11,932,286 | B2 * | 3/2024 | Tam | G07C 5/008 |
| 2019/0300008 | A1 * | 10/2019 | Ando | B60W 50/029 |
| 2021/0086767 | A1 | 3/2021 | Matsunaga | |
| 2021/0237765 | A1 * | 8/2021 | Ando | B60W 60/001 |
| 2023/0116293 | A1 | 4/2023 | Ando et al. | |
| 2023/0400861 | A1 | 12/2023 | Sakai | |

FOREIGN PATENT DOCUMENTS

| | | | |
|---|---|---|---|
| JP | 2022074377 | A | 5/2022 |
| JP | 2023048617 | A | 4/2023 |

* cited by examiner

VEHICLE

CROSS-REFERENCE TO RELATED APPLICATION

This application claims priority to Japanese Patent Application No. 2023-107967 filed on Jun. 30, 2023 incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177807 (JP 2019-177807 A) discloses a vehicle including an autonomous driving kit attached to a rooftop.

SUMMARY

A vehicle capable of operating in both an autonomous mode and a manual mode has been proposed as a vehicle capable of autonomous driving. For example, it is conceivable that a user in the vehicle operating in the manual mode (during manual driving) can switch the mode to the autonomous mode (autonomous driving) as necessary. Such a vehicle initially operates in the manual mode, and starts to operate in the autonomous mode when the user switches the mode to the autonomous mode. Therefore, when a computer that manages the operation mode of the vehicle is temporarily stopped for some reason (for example, an abnormality in the computer or an abnormality in a power supply) while the vehicle is operating in the autonomous mode, a problem may arise in that the operation mode of the vehicle returns to the manual mode due to the reboot of the computer and the vehicle cannot continue the operation in the autonomous mode.

The present disclosure has been made to solve the above problem, and an object thereof is to enable a vehicle to continue an operation in an autonomous mode after the reboot of a computer that manages the operation mode of the vehicle when the computer is temporarily stopped for some reason while the vehicle is operating in the autonomous mode.

A vehicle according to an aspect of the present disclosure includes a vehicle platform, and an autonomous driving kit configured to transmit a command for autonomous driving to the vehicle platform. The vehicle platform includes a base vehicle including a first control device. The autonomous driving kit includes a second control device configured to determine a command related to autonomous driving control. The vehicle platform further includes a vehicle control interface box including a first computer. The first computer is configured to communicate with both the first control device and the second control device. The first computer is configured to detect an operation mode selected from among options including an autonomous mode in which the vehicle platform is under control of the autonomous driving kit and a manual mode in which the vehicle is under control of a driver, and record operation mode information indicating the detected operation mode. The first control device is configured to control the vehicle according to the operation mode detected by the vehicle control interface box. The first computer is configured to, when rebooted, detect the selected operation mode based on the operation mode information recorded immediately before a stop.

According to the present disclosure, the vehicle can continue the operation in the autonomous mode after the reboot of the computer that manages the operation mode of the vehicle when the computer is temporarily stopped for some reason while the vehicle is operating in the autonomous mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic configuration of a vehicle according to an embodiment of the present disclosure;

FIG. 3 is a flowchart illustrating a method of managing an operation mode according to an embodiment of the present disclosure;

FIG. 4 is a time chart showing a first operation example of the vehicle according to the embodiment of the present disclosure;

DETAILED DESCRIPTION OF EMBODIMENTS

Figure 2:
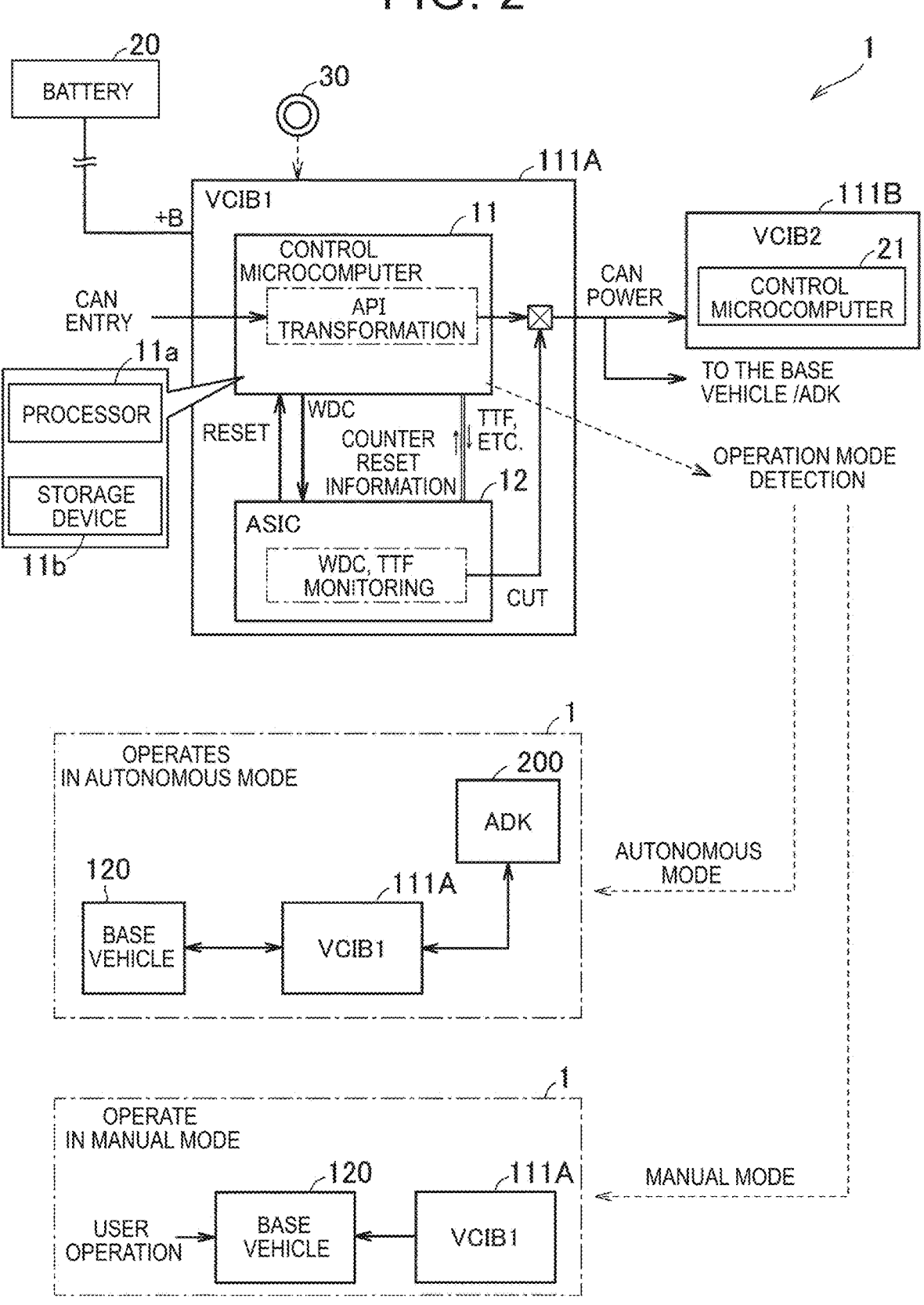
FIG. 2 is a diagram for explaining a configuration and a function of the vehicle control interface box shown in FIG. 1.

Hereinafter, an embodiment of the present disclosure will be described in detail with reference to the drawings. In the drawings, the same or corresponding portions are denoted by the same reference signs and the description thereof will not be repeated.

Figure 1:
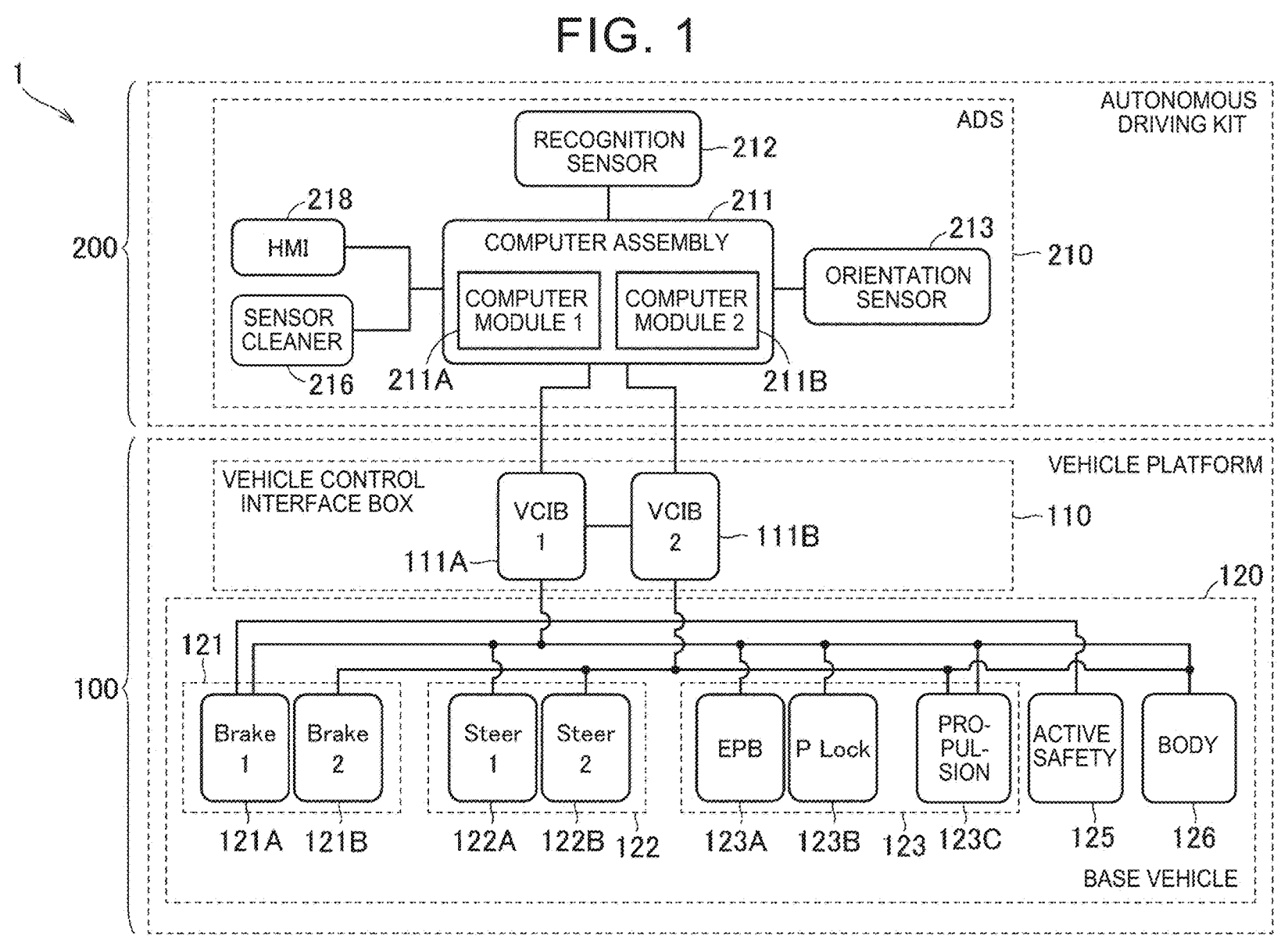

FIG. 1 is a diagram illustrating a schematic configuration of a vehicle according to an embodiment of the present disclosure. Referring to FIG. 1, a vehicle 1 includes a VP (vehicle platform) 100 and a ADK (autonomous driving kit) 200. VP 100 includes a VCIB (Vehicle Control Interface Box) 110 and a base vehicle 120. By adding VCIB 110 to the base vehicle 120, a VP 100 to which ADK 200 can be attached and detached is formed. Then, the vehicle 1 is completed by attaching ADK 200 to VP 100. The base vehicle 120 is, for example, a commercially available electrified vehicle (EV). In this embodiment, battery electric vehicle (BEV) is employed as the base vehicle 120. However, the present disclosure is not limited thereto, and the base vehicle 120 may be a xEV other than BEV. In this embodiment, a ADK 200 is attached to the rooftop of the base vehicle 120. However, the mounting position of ADK 200 can be changed as appropriate.

ADK 200 includes an autonomous driving system (hereinafter, referred to as "ADS") 210 that executes various processes related to autonomous driving. ADS 210 includes a computer assembly (hereinafter referred to as "ADS-COM") 211, a recognition sensor 212, an attitude sensor 213, a sensor cleaner 216, and a Human Machine Interface (HMI) 218.

ADSCOM 211 includes a computer module (hereinafter referred to as "ADC") 211A, 211B. Each of ADC 211A, 211B includes a processor and a storage device that stores autonomous driving software using an API, which will be described later, and is configured to be capable of executing autonomous driving software by the processor. The recognition sensor 212 includes a sensor that acquires information indicating an external environment of the vehicle 1 (hereinafter, also referred to as "environment information"). The recognition sensor 212 may include at least one of a camera, a millimeter wave radar, and a lidar. The attitude sensor 213 acquires information on the attitude of the vehicle 1 (hereinafter, also referred to as "attitude information"). The attitude sensor 213 may include various sensors for detecting acceleration, angular velocity, and position of the vehicle 1. HMI 218 includes an inputting device and a notification device.

The base vehicle 120 includes a braking system 121, a steering system 122, a powertrain system 123, an active safety system 125, and a body system 126. In this embodiment, the electronic control unit (hereinafter also referred to as "ECU") is provided.

VCIB 110 is configured to communicate with both the base vehicle 120 and ADK 200 via communication busses. These physical communications may be communications using Controller Area Network (CAN). In the vehicle 1, a control system related to the behavior (running, stopping, and bending) of the vehicle 1 has redundancy. ADC 211A, 211B gives instructions to the main-control system and the sub-control system, respectively. VCIB 110 includes a control unit (hereinafter referred to as "first VCIB") 111A of the main control system and a control unit (hereinafter referred to as "second VCIB") 111B of the sub-control system. Although details will be described later, in this embodiment, each control unit includes a computer.

The braking system 121 includes a brake mechanism, an operation unit that receives a brake operation from a driver, and a brake control unit 121A, 121B. The steering system 122 includes a steering mechanism, an operation unit that receives a steering operation from a driver, and a steering control unit 122A, 122B. The powertrain system 123 includes a shifting device, a vehicle drive, EPB device, a P-Lock device, a 123A of EPB controls, a 123B of P-Lock controls, and a 123C of propulsion controls. "EPB" means electric parking brake, and "P-Lock" means parking lock. The shift device determines the shift range and switches the propulsion direction and the shift mode of the base vehicle 120 according to the determined shift range. The shift device further includes, in addition to the transmission mechanism, an operation unit that receives a shift operation from the driver. The vehicle driving device applies a propulsive force in a propulsion direction indicated by the shift range. The vehicle driving device includes a driving battery and a traveling motor to which electric power is supplied from the driving battery. The vehicle driving device further includes an accelerator pedal operated by a driver to accelerate the vehicle 1. P-Lock device further includes an operation unit configured to receive a parking operation from the driver in addition to the parking lock mechanism and the actuator.

FIG. 2 is a diagram for explaining a configuration and a function of a VCIB 110. Referring to FIG. 2, the first VCIB 111A includes a microcomputer (control microcomputer) 11 for control and an Application Specific Integrated Circuit (ASIC) 12.

The control microcomputer 11 includes a processor 11*a* and a storage device 11*b*. The control microcomputer 11 receives power from the battery 20. The battery 20 may be a drive battery included in the vehicle drive device described above, or may be an in-vehicle battery (for example, an auxiliary battery) other than the drive battery. DC/DC converters may be provided between the control microcomputer 11 and the battery 20. The storage device 11*b* is, for example, a back-up Random Access Memory (RAM). Backup RAM is also commonly referred to as "standby RAM" or "Retention RAM". The backup RAM receives power from a backup power supply. The backup RAM may be a Non-Volatile SRAM (NVSRAM) in which non-volatility is imparted to Static RAM (SRAM) by the backup power supply. The backup power supply may be the battery 20 or an in-vehicle battery other than the battery 20. Capacitors may be provided to provide power to the storage device 11*b* upon instantaneous interruption of the back-up power supply.

ASIC 12 includes WDC (watchdog timer circuitry). WDC is configured to detect a fixed-period clock signal inputted from the control microcomputer 11 and monitor a normal operation of the control microcomputer 11. When the clock signal is not inputted to ASIC 12 within the timer period, ASIC 12 (WDC) determines that the control microcomputer 11 is operating abnormally and outputs a reset signal to the control microcomputer 11. The control microcomputer 11 that has received the reset signal is in the power-off state and restarts after the reset (microcomputer reset). The control microcomputer 11 and ASIC 12 perform Serial Peripheral Interface (SPI) communication with each other. SPI communication is a synchronous serial communication that performs data communication in synchronization with clocks. The control microcomputer 11 transmits a time-to-fail (TTF) signal to ASIC 12 by SPI communication. ASIC 12 transmits the counter-reset data to the control microcomputer 11 by SPI communication.

The second VCIB 111B also includes a microcomputer (control microcomputer) 21 for control corresponding to the control microcomputer 11. The control microcomputer 21 includes a processor and a storage device. Similarly to the control microcomputer 11, the control microcomputer 21 receives power from, for example, the battery 20. The control microcomputer 11 and the control microcomputer 21 perform CAN communication with each other. Each of the control microcomputers 11 and 21 is configured to be capable of CAN communication with both the base vehicle 120 and ADK 200. In this embodiment, the various control devices included in the base vehicle 120 function as the "first control device" according to the present disclosure alone or in cooperation with each other. Each of ADC 211A, 211B functions as a "second control device" according to the present disclosure. The control microcomputers 11 and 21 correspond to examples of the "first computer" and the "second computer" according to the present disclosure, respectively.

In this embodiment, a signal (API signal) defined in Application Program Interface (API) is used for communication between ADK 200 and VCIB 110. ADK 200 is configured to process various types of signals defined in API. ADK 200 outputs various commands to VCIB 110 in accordance with API. Hereinafter, each of the various commands outputted from ADK 200 to VCIB 110 is also referred to as an "API command". API commands include commands related to autonomous driving control. ADK 200 (ADC 211A, 211B) determines API command-value. ADK 200 also receives from VCIB 110 various signaling indicative of the status of the base vehicle 120 in accordance with API. Hereinafter, each of the above-described various types of signals received by ADK 200 from VCIB 110 is also referred to as "API status". Both API and API statuses correspond to API.

In this embodiment, ADK 200 uses API commands described below.

The vehicle mode command is an API command requesting a transition to an autonomous mode or a manual mode. ADK 200 can select the operation mode (vehicle mode) of the vehicle 1 using the vehicle mode command. The propulsion direction command is an API command requesting switching of a shift range (R/D). The acceleration command is an API command for instructing the acceleration of the vehicle. The acceleration command requests acceleration (+) and deceleration (−) with respect to a direction indicated by a propulsion direction status to be described later. The immobilization command is an API command requesting application or removal of immobilization. The application of immobilization means that EPB is in ON state (operating state) and the shift range is in the P (parking) state.

Some API commands used in the vehicle 1 have been described above. VCIB 110 receives various API commands from ADK 200. Upon receiving API command from ADK 200, VCIB 110 converts API command into a form of a signal executable by the controller of the base vehicle 120. Hereinafter, API command converted into the format of the signal executable by the control device of the base vehicle 120 is also referred to as an "in-house command". When VCIB 110 receives API command from ADK 200, it outputs an inside command corresponding to API command to the base vehicle 120.

Next, API status will be described. ADK 200 grasps the status of the base vehicle 120 using, for example, API status described below.

The vehicle mode status is an API status indicating a vehicle mode status. The operation mode (vehicle mode) of the vehicle 1 includes a manual mode, an autonomous mode, and a standby mode. The manual mode is an operation mode in which the vehicle is under the control of a driver (human). The autonomous mode is an operation mode in which the vehicle platform (including the base vehicle) is under the control of the autonomous driving kit. The standby mode is an operation mode in which movement of the vehicle is prohibited. The driver can select a desired operation mode through the in-vehicle HMI. The base vehicle 120 selects the operation mode in consideration of the situation of the vehicle 1 and the selection of the driver. The vehicle mode status outputs corresponding values "0", "1", and "2" when the current operation mode is the manual mode, the autonomous mode, or the standby mode.

The propulsion direction status is an API status indicating the present shift range. The traveling direction status is an API status indicating a traveling direction of the vehicle. In the traveling direction status, a value "0" is outputted when the vehicle moves forward, a value "1" is outputted when the vehicle moves backward, and a value "2 (Standstill)" is outputted when all the wheels (four wheels) continuously indicate the speed "0" for a predetermined time. The vehicle speed status is an API status indicating a vertical speed of the vehicle. The vehicle speed status outputs an absolute value of the vehicle speed. The immobilization status is an API status indicating a status of immobilization.

Some API statuses used in the vehicle 1 have been described above. VCIB 110 receives various sensor detection values and state determination results from the base vehicle 120, and outputs various API statuses indicating the state of the base vehicle 120 to ADK 200. VCIB 110 acquires API status in which the status indicating the status of the base vehicle 120 is set, and outputs the obtained API status to ADK 200.

The vehicle 1 further includes a start switch 30 that receives a user operation for switching between the operation and the stop of VP 100 control system (including the control microcomputers 11 and 21 and various ECU of the base vehicle 120). In general, the start switch of a vehicle is referred to as a "power switch" or an "ignition switch" or the like. When the user operates the start switch 30, the control system of VP100 is switched on (activated) and off (deactivated). When the control system is shut down, the start switch 30 is turned off. In this embodiment, the ignition relay (IGR) (not shown) is switched on (closed) and off (open) according to the state (activation or deactivation) of the start switch 30. The control microcomputer 11 is configured to be able to detect the state of the start switch 30 (IGR state) and its own operating state. Hereinafter, the operation status of the control microcomputer 11 will be referred to as "inner IGR". The control microcomputer 11 sequentially acquires the inner IGR. When the control microcomputer 11 is in the power-on state, the inner IGR indicates on (operating state). When the control microcomputer 11 is in a shutdown state or a power-off state, the inner IGR indicates off (stopped state). When the start switch 30 is turned on, the control microcomputer 11 is activated and the power is turned on. The control microcomputer 11 starts the shutdown process by the off operation of the start switch 30, and when the shutdown process is completed, the control microcomputer 11 enters the power-off state.

In this embodiment, an interface computer (hereinafter referred to as "IFCOM") included in VCIB 110 detects an operation mode selected from options including a plurality of types of operation modes (e.g., manual mode, autonomous mode, and standby mode) and outputs the detected operation mode to the base vehicle 120. The control microcomputer 11 selects one of the control microcomputer 11 and the control microcomputer 21 as an IFCOM. IFCOM converts API commands from ADK 200 into internal commands, and outputs the obtained internal commands to the base vehicle 120 together with the operation modes. IFCOM acquires API status using the vehicle data from the base vehicle 120, and outputs the obtained API status to ADK 200. The operation mode is selected by, for example, one of the user, the base vehicle 120, and ADK 200. Further, the server outside the vehicle may switch the operation mode of the vehicle 1 as necessary. The control device of the base vehicle 120 controls the vehicle 1 in accordance with the operation mode detected by IFCOM.

The control microcomputer 11 periodically detects the selected operation mode and the state (activation or deactivation) of the start switch 30. Each time an operation mode is detected, the control microcomputer 11 records operation mode information indicating the detected operation mode in the storage device 11$b$. When the control microcomputer 11 is restarted, the control microcomputer 11 detects the selected operation mode based on the operation mode information recorded immediately before the stop. In addition, when both of the state of the detected start switch 30 indicates the operation (first requirement) and the detected operation mode is the autonomous mode (second requirement), the control microcomputer 11 records predetermined information (history information) in the storage device 11$b$, and when at least one of the first requirement and the second requirement is not satisfied, the control microcomputer 11 erases the history information in the storage device 11$b$. The historical information may be recorded by polling. Hereinafter, a state in which the storage device 11*b* stores the history information is referred to as "history ON", and a state in which the storage device 11*b* does not store the history information is referred to as "history OFF". The control microcomputer 11 determines whether or not the history is ON at the time of restart. When it is determined to be the history ON, ASIC 12 executes CAN cutting process after the control microcomputer 11 is restarted. During CAN cutting, CAN is cut off from the control microcomputer 11. As a result, communication between the control microcomputer 11 and the control microcomputer 21 is stopped.

autonomous mode is selected, and when the control microcomputer 11 is restarted in a state in which the start switch 30 indicates the operation (on-operated state), it is highly likely that the stop of the control microcomputer 11 is unintentional (e.g., stop caused by an internal abnormality or power supply abnormality of the control microcomputer 11), the control microcomputer 11 may have been damaged. Therefore, in the above configuration, the communication between the control microcomputer 11 and the control microcomputer 21 is stopped, and the control microcomputer 21 is not affected by the control microcomputer 11. According to such a configuration, even if an abnormality occurs in the control microcomputer 11, the control microcomputer 21 can easily operate normally.

While the communication between the control microcomputer 11 and the control microcomputer 21 is stopped, the control microcomputer 11 selects the control microcomputer 21 as an IFCOM. On the other hand, after the communication between the control microcomputer 11 and the control microcomputer 21 is stopped, when the control microcomputer 11 is normally activated, the control microcomputer 11 cancels the stop (CAN cutting) of the communication and selects the control microcomputer 11 as an IFCOM. IFCOM periodically detects the selected operation mode and, each time the operation mode is detected, outputs the detected operation mode to the control device of the base vehicle 120. Similarly to the control microcomputer 11, the control microcomputer 21 may have a non-volatile storage device. The restarted control microcomputer 21 may detect the selected operation mode based on the operation mode information recorded in the storage device immediately before the stop. The base vehicle 120 recognizes the selected operation mode based on the information from IFCOM (VCIB 110). During a time period in which the operation mode is not outputted from VCIB 110 to the base vehicle 120, the base vehicle 120 may recognize that the selected operation mode is the manual mode, activate the active safety system 125, and execute the deceleration control of the vehicle 1 by the active safety system 125. Alternatively, the base vehicle 120 may notify the driver that the vehicle 1 is operating in the manual mode. In the following description, the information indicating the selected operation mode is referred to as an "inner VEMDST". The base vehicle 120 sequentially acquires the internal VEMDST and controls the vehicle 1 according to the most recent internal VEMDST.

According to the above-described configuration, IFCOM for managing the operation mode of the vehicle 1 is switched according to the situation. Specifically, when there is a possibility that the control microcomputer 11 is damaged, the control microcomputer 21 can operate as an IFCOM. Since both the control microcomputer 11 and the control microcomputer 21 can function as IFCOM, the robustness of VCIB 110 is increased.

Figure 3:
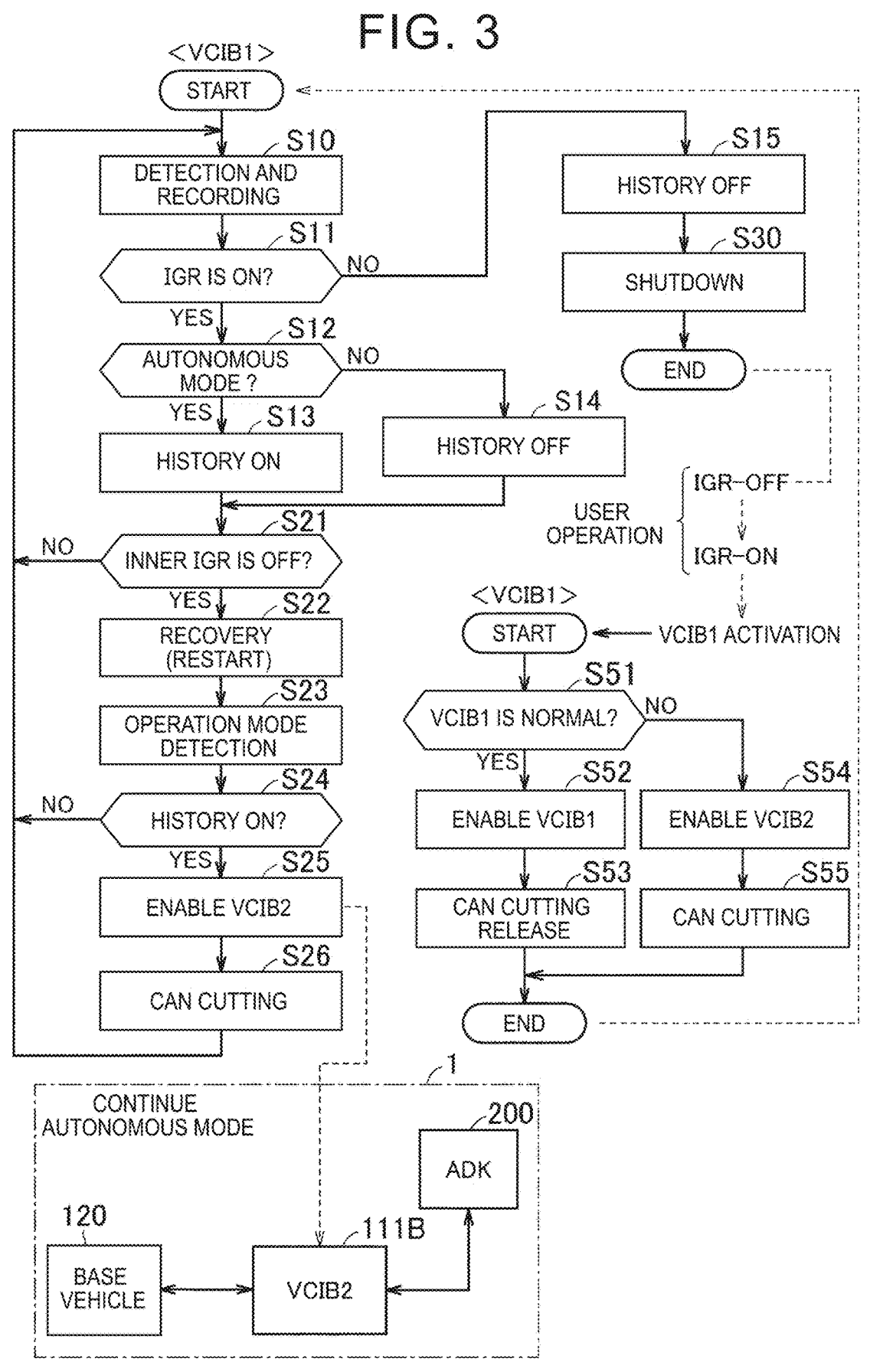

FIG. 3 is a flowchart illustrating a process related to management of an operation mode executed by the control microcomputer 11. Hereinafter, each step in the flowchart will be referred to as "S". When activated in a normal condition, the control microcomputer 11 selects the control microcomputer 11 as an IFCOM and starts S10 and the subsequent process flow (hereinafter, referred to as "S10 flow").

In S10, the state of the start switch 30 (IGR state) and the present operation mode (selected operation mode) are detected, and the detected result is recorded in the storage device 11*b*. As a result, the operation mode information indicating the detected operation mode is recorded in the storage device 11*b*. In the following S11, the control microcomputer 11 determines whether the ignition relay (IGR) is on-state or not. IGR being on-state (YES in S11) means that the first requirement is met. In S12, the control microcomputer 11 determines whether or not the operation mode detected by S10 is the autonomous mode. The fact that the detected operation mode is the autonomous mode (YES in S12) means that the second requirement is satisfied. If both the first requirement and the second requirement are satisfied (YES in both S11, S12), the control microcomputer 11 sets the history ON in S13. Thereafter, the process proceeds to S21. When the first requirement is satisfied and the second requirement is not satisfied (YES in S11 and NO in S12), the control microcomputer 11 sets the history OFF in S14. Thereafter, the process proceeds to S21. When the first requirement is not satisfied (NO in S11), the control microcomputer 11 sets the history OFF in S15. Thereafter, the process proceeds to S30.

In S21, the control microcomputer 11 acquires the present inner IGR and determines whether or not the obtained inner IGR indicates off-state. When the inner IGR indicates ON (NO in S21), the control microcomputer 11 is highly likely to be normal, and thus the process returns to S10. Here, the control microcomputer 11 operates as an IFCOM while executing S10 flow. On the other hand, when the inner IGR is turned off while satisfying the first requirement (YES in S21), the control microcomputer 11 is stopped under some circumstances. In this instance, the control microcomputer 11 returns (restarts) in the subsequent S22. Further, in a subsequent S23, the returned control microcomputer 11 detects the present operation mode (selected operation mode) based on the operation mode information recorded in S10 immediately before stopping, and transmits the detected operation mode to the control microcomputer 21. In the following S24, it is determined whether or not the control microcomputer 11 is in a history ON. If it is determined that there is a history OFF (NO in S24), the process returns to S10. On the other hand, when it is determined that there is a history ON (YES in S24), the process proceeds to S25. In S25, the control microcomputer 11 selects the control microcomputer 21 as IFCOM. This activates the second VCIB 111B and deactivates the first VCIB 111A. That is, the control microcomputer 21 operates as an IFCOM instead of the control microcomputer 11. In the following S26, ASIC 12 executes CAN cutting process based on the signal from the control microcomputer 11. As a result, communication between the control microcomputer 11 and the control microcomputer 21 is stopped. Thereafter, the process returns to S10. The control microcomputer 11 continues S10 process in the inactive condition.

When the autonomous mode is detected in S23, the control microcomputer 21 activated by S25 process causes the vehicle 1 to operate in the autonomous mode. The control microcomputer 21 may execute stop control (safety stop control) of the vehicle 1 according to an instruction from ADK 200 in the autonomous mode. After the vehicle 1 stops, the control microcomputer 21 may restart the control system. Alternatively, the control microcomputer 21 may request the user to operate the start switch 30 for restarting the control system. Thus, the control system (including the control microcomputer 11) of the vehicle 1 is restarted. However, the present disclosure is not limited thereto, and the active control microcomputer 21 may continue the traveling of the vehicle 1 in the autonomous mode. The control microcomputer 21 may execute, for example, an automatic driving control similar to the control microcomputer 11 or a more limited automatic driving control. The limit may be a speed limit.

When the start switch 30 is turned off by the user, the control microcomputer 11 is determined to be NO in S11, and the control microcomputer 11 performs a shutdown process in S30. When the shutdown process is completed, the control microcomputer 11 is powered off, and S10 process ends. After that, for example, when the start switch 30 is turned on and the control microcomputer 11 is restarted, the control microcomputer 11 starts S51 and the subsequent process flow (hereinafter, referred to as "S51 flow"). In S51, the control microcomputer 11 determines whether or not the control microcomputer 11 has been activated normally. When the control microcomputer 11 is activated normally (YES in S51), the control microcomputer 11 selects the control microcomputer 11 as an IFCOM in S52. This activates the first VCIB 111A and deactivates the second VCIB 111B. That is, the control microcomputer 11 operates as an IFCOM. In the following S53, CAN cutting by ASIC 12 is released based on the control microcomputer 11. When ASIC 12 does not execute CAN cutting, the control microcomputer 11 executes CAN communication. Thus, communication between the control microcomputer 11 and the control microcomputer 21 is executed. On the other hand, when the control microcomputer 11 is activated in a non-normal condition (NO in S51), the control microcomputer 21 is selected as IFCOM in S54 and CAN cutting process is executed in S55 in the same manner as the above-described S25 and S26. When S53 or S55 process is executed, S51 process ends. Then, the activated control microcomputer 11 starts S10 process.

Figure 4:
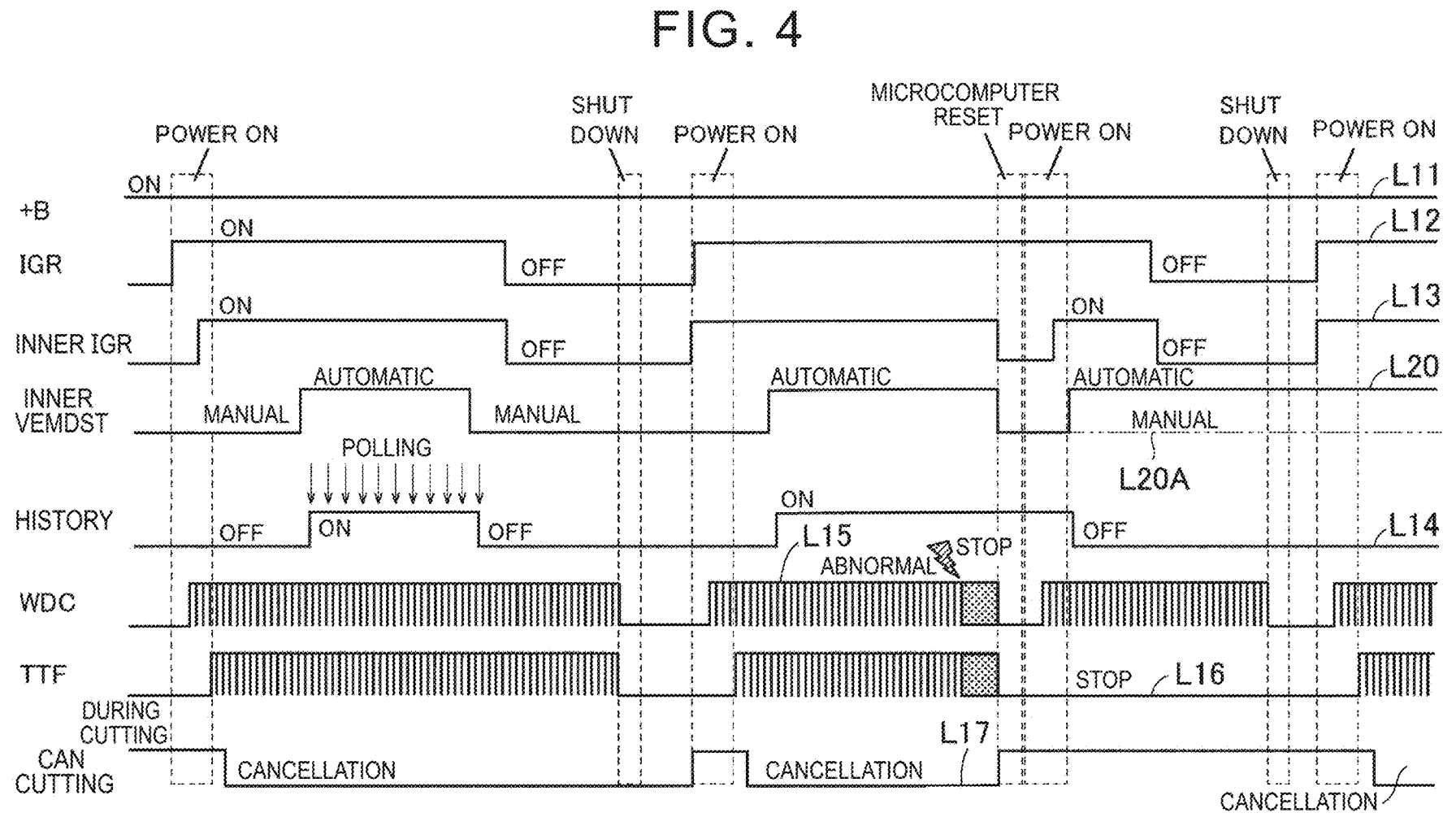
Figure 5:
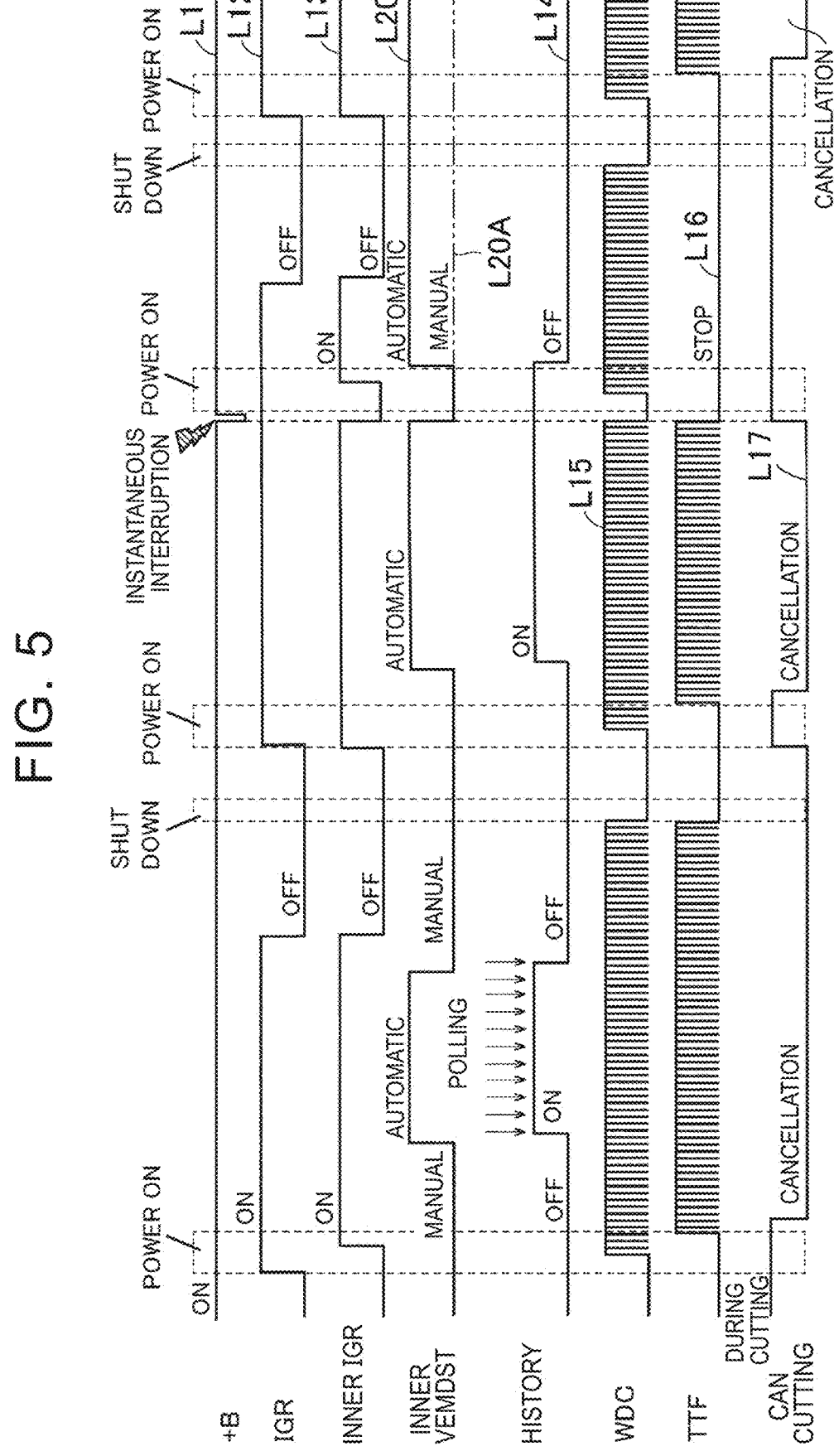
FIG. 5 is a time chart showing a second exemplary operation of the vehicle according to the embodiment of the present disclosure.

Hereinafter, operations and effects of the vehicle 1 according to this embodiment will be described with reference to FIGS. 4 to 6. In FIGS. 4 and 5, the respective operations of the vehicle 1 (embodiment) according to this embodiment and the vehicle that always starts in the manual mode (hereinafter referred to as "comparative example") are shown in comparison with each other. In each of FIGS. 4 to 6, lines L11 to L17 indicate a status transition of the control microcomputer 11. Specifically, the line L11 indicates whether power is supplied to the control microcomputer 11, the line L12 indicates IGR condition, the line L13 indicates the inner IGR, the line L14 indicates the history ON/OFF, the line L15 indicates the clock signal, the line L16 indicates TTF signal, and the line L17 indicates the presence or absence of CAN cutting with respect to WDC. In addition, the line L20 indicates an inner VEMDST of the embodiment. Line L20A shows the interior VEMDST of the comparative embodiment.

FIG. 4 is a time chart illustrating a first operation example of the vehicle according to the present embodiment. Referring to FIG. 4, as indicated by the line L15, when WDC detects an abnormality (an internal abnormality of the control microcomputer 11), the control microcomputer 11 is restarted by the microcomputer reset. When the microcomputer is reset while the vehicle 1 is operating in the autonomous mode, the control microcomputer 11 is restarted in the history ON. Therefore, after the restart, the process of S25, S26 of FIG. 3 is executed. Thus, IFCOM is switched from the control microcomputer 11 to the control microcomputer 21. Therefore, as indicated by the line L20, the vehicle 1 automatically resumes (continues) the operation in the autonomous mode.

FIG. 5 is a time chart illustrating a second operation example of the vehicle according to the present embodiment. Referring to FIG. 5, as indicated by the line L11, when an instantaneous interruption of power supply (power supply failure of the control microcomputer 11) occurs when the vehicle 1 is operating in the autonomous mode, the control microcomputer 11 is restarted in the history ON. Therefore, after the restart, the process of S25, S26 of FIG. 3 is executed. Thus, IFCOM is switched from the control microcomputer 11 to the control microcomputer 21. Therefore, as indicated by the line L20, the vehicle 1 automatically resumes (continues) the operation in the autonomous mode.

On the other hand, in the comparative example, when the computer that manages the operation mode of the vehicle when the vehicle is operating in the autonomous mode temporarily stops due to some reason (for example, an internal abnormality or a power supply abnormality of the computer), the operation mode of the vehicle returns to the manual mode by restarting the computer, as shown by the line L20A in FIGS. 4 and 5.

Figure 6:
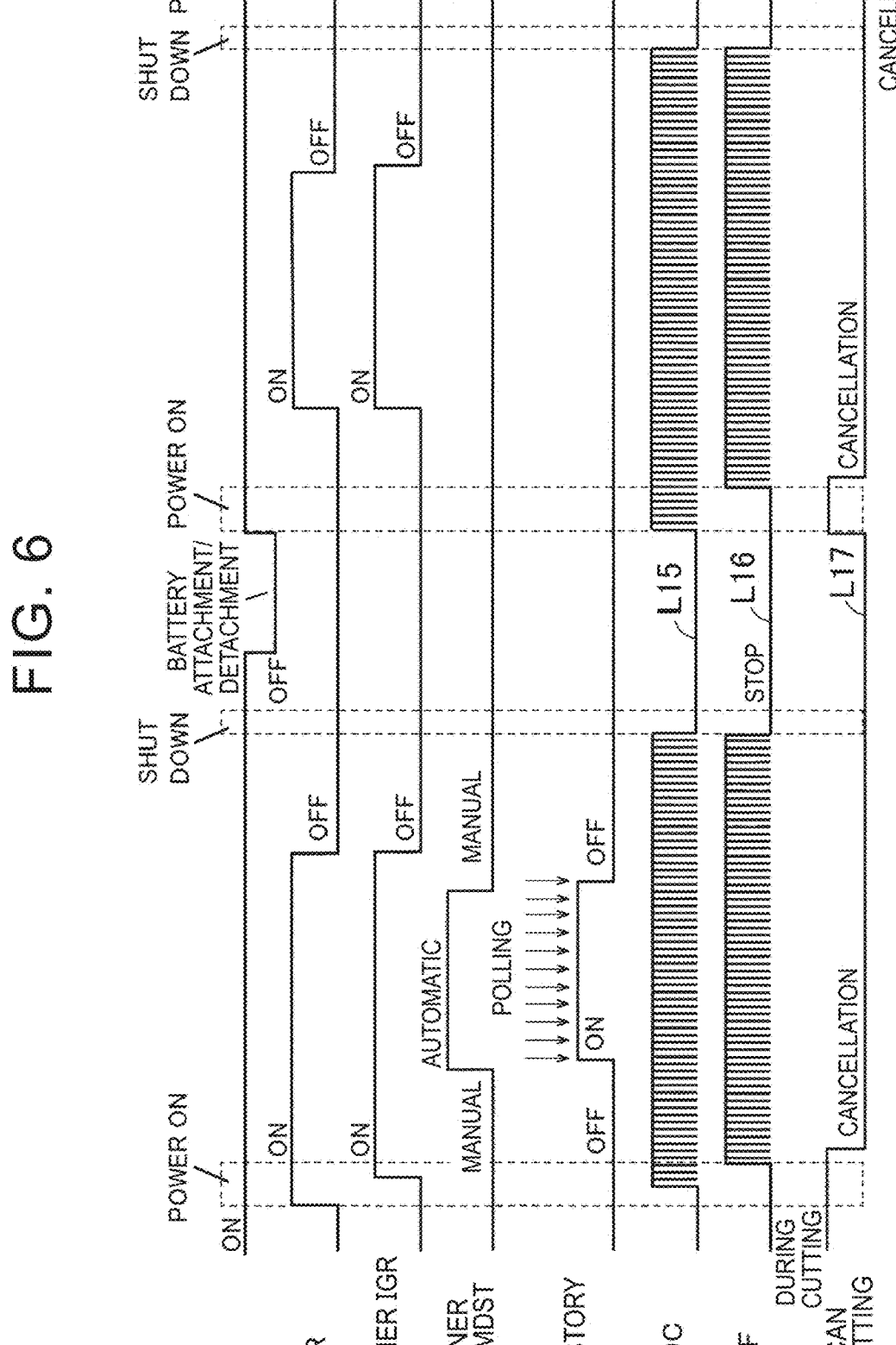
FIG. 6 is a time chart illustrating a third operation example of the vehicle according to the embodiment of the present disclosure.

FIG. 6 is a time chart illustrating a third operation example of the vehicle according to the present embodiment. Referring to FIG. 6, when the battery 20 is replaced (detached) while the vehicle 1 is operating in the manual mode as indicated by the line L11, the control microcomputer 11 is restarted in the history OFF. Therefore, the process of S25, S26 of FIG. 3 is not executed. After the control microcomputer 11 is restarted, the vehicle 1 operates in the manual mode. In this way, when the control microcomputer 11 temporarily stops due to some reason, the vehicle 1 continues the operation in the operation mode immediately before the stop after the restart of the control microcomputer 11.

The vehicle 1 according to this embodiment records the operation mode information in the backup RAM (S10 of FIG. 3). By using the backup RAM as the storage device 11b, the operation mode information recorded in the backup RAM immediately before the control microcomputer 11 is stopped is held even after the control microcomputer 11 is restarted. Backup RAM have the benefit of faster accessing rates compared to non-volatile memory, such as flash memory. Further, the data stored in the back-up RAM can be read at any timing immediately after activation of the control microcomputer 11, and can be initialized as needed. However, the present disclosure is not limited thereto, and a nonvolatile memory such as a flash memory may be employed as the storage device 11b.

It is to be understood that the embodiments disclosed herein are illustrative and non-restrictive in all respects. The technical scope indicated by the present disclosure is indicated by the claims rather than the description of the above-described embodiments, and is intended to include all modifications within the meaning and scope equivalent to the claims.

What is claimed is:

1. A vehicle comprising:
   a vehicle platform comprising:
      a base vehicle including a first control device,
      a vehicle control interface box including a first computer and a second computer, the first computer configured to communicate with both the first control device and a second control device, and the second computer configured to communicate with the first computer;

an autonomous driving kit configured to transmit a command for autonomous driving to the vehicle platform, the autonomous driving kit comprising the second control device, the second control device configured to determine a command related to autonomous driving control, wherein the command for autonomous driving includes the command related to autonomous driving control; and a start switch configured to receive a user operation for switching a control system to operate or stop, wherein:

the first computer comprises a storage device and is further configured to select the first computer or the second computer as an interface computer, when the first computer is selected as the interface computer, the first computer is further configured to:

periodically detect an operation mode selected from among options including an autonomous mode in which the vehicle platform is under control of the autonomous driving kit and a manual mode in which the vehicle is under control of a driver, periodically record operation mode information indicating the operation mode, output the operation mode to the first control device, detect a state of the start switch, and based on the state of the start switch indicating that the control system is operating and based on the operation mode being the autonomous mode, record history information in the storage device, and based on the history information being recorded, when rebooting, select the second computer as the interface computer;

after the rebooting, based on the state of the start switch indicating that the control system is not operating, select the first computer as the interface computer;

when the second computer is selected as the interface computer, the second computer is configured to:

detect the operation mode recorded immediately before the rebooting, and output the operation mode to the first control device;

the vehicle control interface box is configured to:

based on the second computer detecting the operation mode recorded immediately before the rebooting, execute Controller Area Network (CAN) cutoff, wherein the CAN cutoff stops communication between the first computer and the second computer, and based on the first computer being selected as the interface computer after the CAN cutoff, terminate the CAN cutoff; and the first control device is configured to control the base vehicle based on the operation mode.

2. The vehicle according to claim 1, wherein:

the second computer is configured to communicate with both the first control device and the second control device; and the first computer is selected as the interface computer when the first computer is started in a normal state after the CAN cutoff.

3. The vehicle according to claim 1, wherein:

the first control device is configured to transmit vehicle information related to the base vehicle to the vehicle control interface box;

the second control device is configured to communicate with the vehicle control interface box via an application program interface signal;

the application program interface signal includes an application program interface command indicating a command for the base vehicle, and an application program interface status indicating a status of the base vehicle;

the interface computer is configured to convert the application program interface command from the second control device into a signal executable by the first control device, and transmit the signal to the first control device; and the interface computer is configured to acquire the application program interface status by using the vehicle information from the first control device, and transmit the acquired application program interface status to the second control device.

4. The vehicle according to claim 1, wherein the first computer is configured to record the operation mode information in a backup random access memory.

* * * * *